(12) United States Patent
Stringham et al.

(10) Patent No.: US 7,743,028 B1
(45) Date of Patent: Jun. 22, 2010

(54) INCREMENTAL BACKUP OF PARTIAL VOLUMES

(75) Inventors: Russell Stringham, Orem, UT (US); Paul Madden, Lehi, UT (US); Jonathan Ludwig, Lehi, UT (US)

(73) Assignee: Symantec Corporation, Mountain View, CA (US)

( * ) Notice: Subject to any disclaimer, the term of this patent is extended or adjusted under 35 U.S.C. 154(b) by 550 days.

(21) Appl. No.: 11/180,401

(22) Filed: Jul. 13, 2005

(51) Int. Cl.
*G06F 7/00* (2006.01)

(52) U.S. Cl. ........................................ 707/646; 711/162
(58) Field of Classification Search ........................ None
See application file for complete search history.

(56) References Cited

U.S. PATENT DOCUMENTS

| | | | | |
|---|---|---|---|---|
| 5,765,173 | A * | 6/1998 | Cane et al. .................. 707/204 |
| 6,665,815 | B1 * | 12/2003 | Goldstein et al. ............. 714/20 |
| 6,681,228 | B2 * | 1/2004 | Balogh .......................... 707/10 |
| 6,771,843 | B1 * | 8/2004 | Huber et al. ................. 382/305 |
| 6,802,025 | B1 * | 10/2004 | Thomas et al. ................. 714/15 |
| 6,895,415 | B1 * | 5/2005 | Rezaul Islam et al. ...... 707/204 |
| 7,096,330 | B1 * | 8/2006 | Root et al. ................... 711/162 |
| 7,100,089 | B1 * | 8/2006 | Phelps .......................... 714/42 |
| 7,165,156 | B1 * | 1/2007 | Cameron et al. ............. 711/162 |
| 7,191,304 | B1 * | 3/2007 | Cameron et al. ............. 711/202 |
| 7,254,682 | B1 * | 8/2007 | Arbon ......................... 711/161 |
| 2002/0091670 | A1 * | 7/2002 | Hitz et al. ........................ 707/1 |
| 2003/0158861 | A1 * | 8/2003 | Sawdon et al. .............. 707/200 |
| 2003/0158863 | A1 * | 8/2003 | Haskin et al. ................ 707/200 |
| 2003/0159007 | A1 * | 8/2003 | Sawdon et al. .............. 711/154 |
| 2004/0117572 | A1 * | 6/2004 | Welsh et al. ................. 711/162 |
| 2005/0050110 | A1 * | 3/2005 | Sawdon et al. .............. 707/201 |
| 2005/0246397 | A1 * | 11/2005 | Edwards et al. ............. 707/204 |
| 2006/0041727 | A1 * | 2/2006 | Adkins et al. ............... 711/162 |
| 2006/0155712 | A1 * | 7/2006 | Prahlad et al. .............. 707/100 |
| 2006/0179261 | A1 * | 8/2006 | Rajan .......................... 711/162 |

OTHER PUBLICATIONS

Altiris, Rapideploy 6.1 Help, Altiris, Mar. 2004.*

* cited by examiner

*Primary Examiner*—Neveen Abel Jalil
*Assistant Examiner*—Vei-Chung Liang
(74) *Attorney, Agent, or Firm*—Holland & Hart LLP (57) ABSTRACT

Mechanisms for generating an incremental backup of a set of data blocks while excluding certain files that are less desired to be backed up. Examples of such files include temporary Internet files and the recycle bin. This allows the size of the incremental backup to be reduced significantly since such undesired files are often changed between backups. The incremental backup is constructed by first calculating which data blocks should be included in the incremental backup. The calculation is a function of at least the identity of which if any of the data blocks in a prior snapshot have been or would have been altered as a result of potential file alterations in the prior snapshot, and/or which if any of the data blocks in the subsequent snapshot have been or would have been altered as a result of potential file alterations in the subsequent snapshot.

22 Claims, 4 Drawing Sheets

Fig. 4

INCREMENTAL BACKUP OF PARTIAL VOLUMES

CROSS-REFERENCE TO RELATED APPLICATIONS

The present application is related to commonly-assigned, co-pending U.S. patent application Ser. No. 10/902,690 filed Jul. 28, 2004, which is incorporated herein by reference in its entirety.

BACKGROUND OF THE INVENTION

1. The Field of the Invention

The present invention relates to computing backup and restore technology; and more specifically, to mechanisms for generating an incremental backup of a partial volume, and for performing the backup of the same.

2. Background and Related Art

Computing technology has transformed the way we work and play. Businesses, residences, and other enterprises have come to rely on computing systems to manage their key operational data. Often, the data itself is many times more valuable to an enterprise than the computing hardware that stores the data. Accordingly, in this information age, many enterprises have taken precautions to protect their data.

One way of protecting data is to introduce storage redundancy. For example, a primary computing system maintains and operates upon the active data also referred to herein as a "live volume". A volume is a logical group of data blocks (e.g., sectors on a disk) that are set aside for use by a file system. On desktop systems, a volume is usually equivalent to a disk partition.

At a particular point in time, the primary computing system captures the current state of the active data. The processes of capturing the current state of active data on the primary computing system is also often referred to as taking a "snapshot" of the active data. While there may be a variety of ways of taking a snapshot of the active data, one example will now be described. In the example, from the point of the snapshot forward, if there is a write to the active data, the data that is about to be overwritten is instead copied to another location, and a snapshot table is updated to reflect that the snapshot copy of that portion of the data is in another location. Thus, the snapshot may be preserved while the primary computing system continues to operate upon the active data. At some point, the data from the snapshot may be backed up to the backup computing system. Hereinafter, the active volume that continues to be operated upon by the system separate and apart from the snapshot may be referred to as the "live volume". The snapshot may be referred to as the "snapped volume".

In order to do a full (also called a "base") backup, the backup process conventionally compiles the snapshot version of all of the used clusters in a file system into a base backup image file. The blocks that need to be included in this backup can be determined by the system bitmap. The used data blocks (e.g., sectors or clusters) in a file system may be determined from a system bitmap. As used herein, a "bitmap" is a data structure that has one bit for every data block in a volume. A conventional system bitmap has each bit set if the corresponding data block is in use (e.g., is allocated) by the file system, and clear if the corresponding data block is not in use by the file system.

After a full backup is taken, a snapshot device driver monitors the live volume of the primary computing system and keeps track of each block that has been modified since the last backup. It does this by using what will be referred to herein as a "vdiff" bitmap. When the snapshot is taken for the full backup, the vdiff bitmap has all of its bits initially clear. Until the next snapshot time, if there is a write to the blocks of the live volume, the bit corresponding to the data block being written to is set.

When the next incremental backup is taken, only the blocks that have been modified and that are part of the file system are captured. The incremental bitmap specifies which blocks need to be captured. In conventional incremental imaging, the incremental bitmap may be computed by bit-wise ANDing the system bitmap with the vdiff bitmap. The full backup corresponding to the time that the incremental image is taken can be reconstructed by accessing blocks in the incremental image, and if they are not present in the incremental image, accessing blocks from the base image.

However, often it is not necessary or desirable to backup all files on a system. There are some files that are simply not a high priority for backing up. Excluding these files from a backup can reduce the size of the backup, as well as the time that it takes to create or restore the backup. A good example of files that do not need to be backed up is a user's temporary Internet files, which serve as a cache of files visited recently. Generally there is no need to back them up, and because this cache can be large and changes often, eliminating these files can significantly reduce the size of base and backup images. Another example would be the WINDOWS recycle bin, which also contains old files that the user should not need to back up.

Accordingly, what would be advantageous are mechanisms that permit base and incremental images to be taken, but while allowing certain files to be excluded from the base and incremental images.

BRIEF SUMMARY OF THE INVENTION

The foregoing problems with the prior state of the art are overcome by the principles of the present invention, which are directed towards mechanisms for generating an incremental backup of a set of data blocks while excluding certain files that are less desired to be backed up. Examples of such files include temporary Internet files and the recycle bin. This allows the size of the incremental backup to be reduced significantly since such undesired files are often changed between backups.

On a prior backup, the mechanism takes a snapshot of the set of data blocks. Optionally, then one or more files having associated data blocks included in the prior snapshot are then altered. In particular, if the files are not desired to be backed up, the files are deleted from the snapshot. The mechanism then identifies which data blocks in the prior snapshot have been altered as a result of altering the one or more files. The prior backup is then performed using at least a portion of the prior snapshot. That prior backup may be a base backup or an incremental backup.

Regardless of whether the prior snapshot had been altered, and regardless of whether or not the prior backup was a base or incremental backup, the mechanism takes a subsequent snapshot of the set of data blocks in preparation for an incremental backup. Optionally, one or more files having associated data blocks included in the subsequent snapshot are then altered. In particular, if the files are not desired to be backed up, the files are deleted from the snapshot. The mechanism then identifies which data blocks in the subsequent snapshot have been altered as a result of altering the one or more files.

The mechanism then calculates which of the set of data blocks in the subsequent snapshot should be backed up as part of the incremental backup as a function of at least the identity of which, if any, of the data blocks in the prior snapshot have been altered, and/or which if any of the data blocks in the subsequent snapshot have been altered. The incremental backup may then be assembled based on the backup. Alternatively, this calculation may be made without actually altering the files or blocks in the snapshot. Instead, the mechanism may simply determine what files should be altered, identify what data blocks would be altered, and then perform the calculation based on what data blocks would be altered.

Additional embodiments of the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE SEVERAL VIEWS OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for generating an incremental backup of a set of data blocks while excluding certain files that are less desired to be backed up. Examples of such files include temporary Internet files and the recycle bin. This allows the size of the incremental backup to be reduced significantly since such undesired files are often changed between backups.

First, a general computing system will be described with respect to FIG. 1, as being a suitable computing system that may be used to practice the principles of the present invention. Then, the principles of the present invention will be described with respect to FIGS. 2, 3 and 4.

Figure 1:
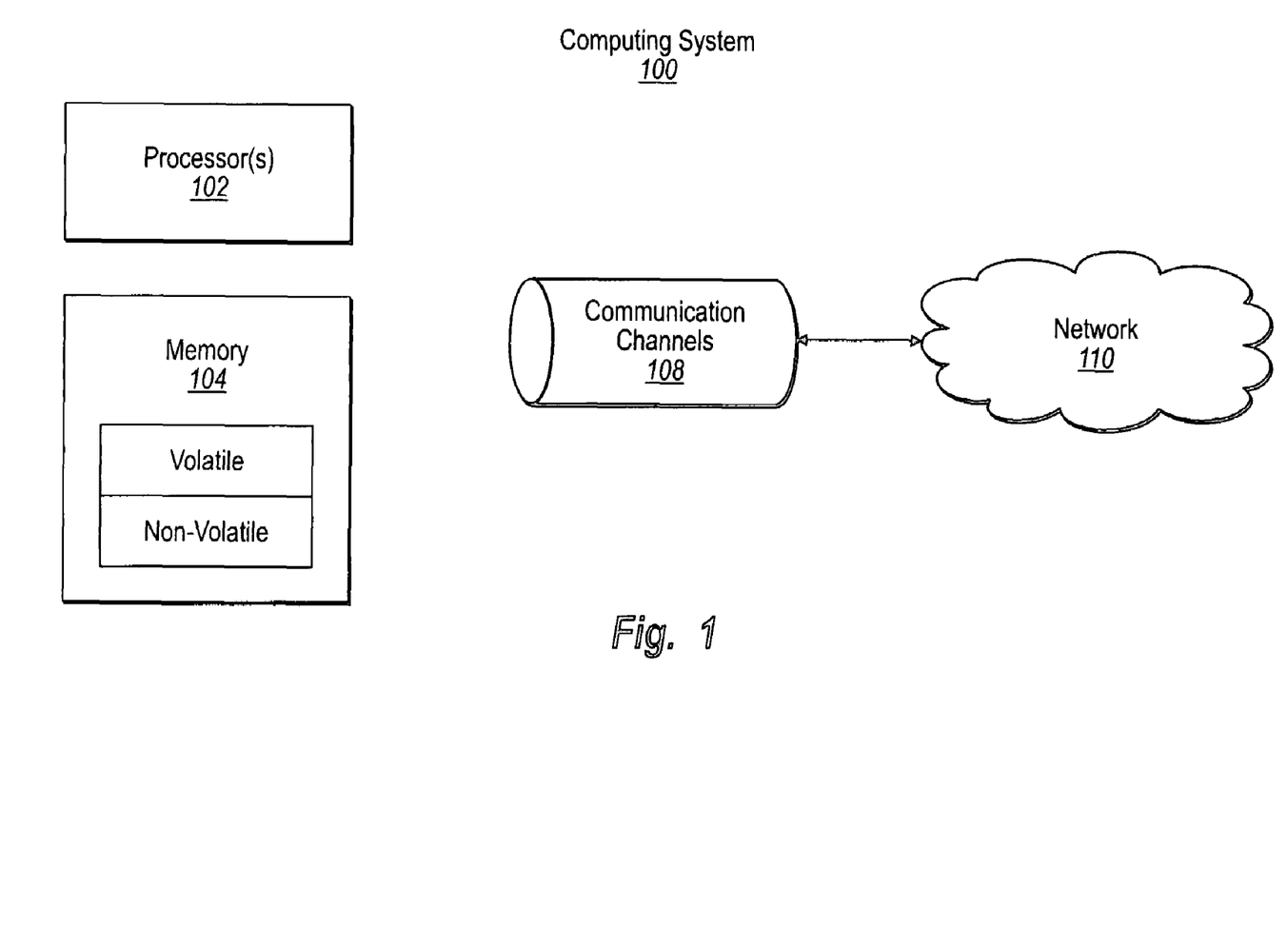
FIG. 1 illustrates a computing system that may be used to implement features of the present invention.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide-variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
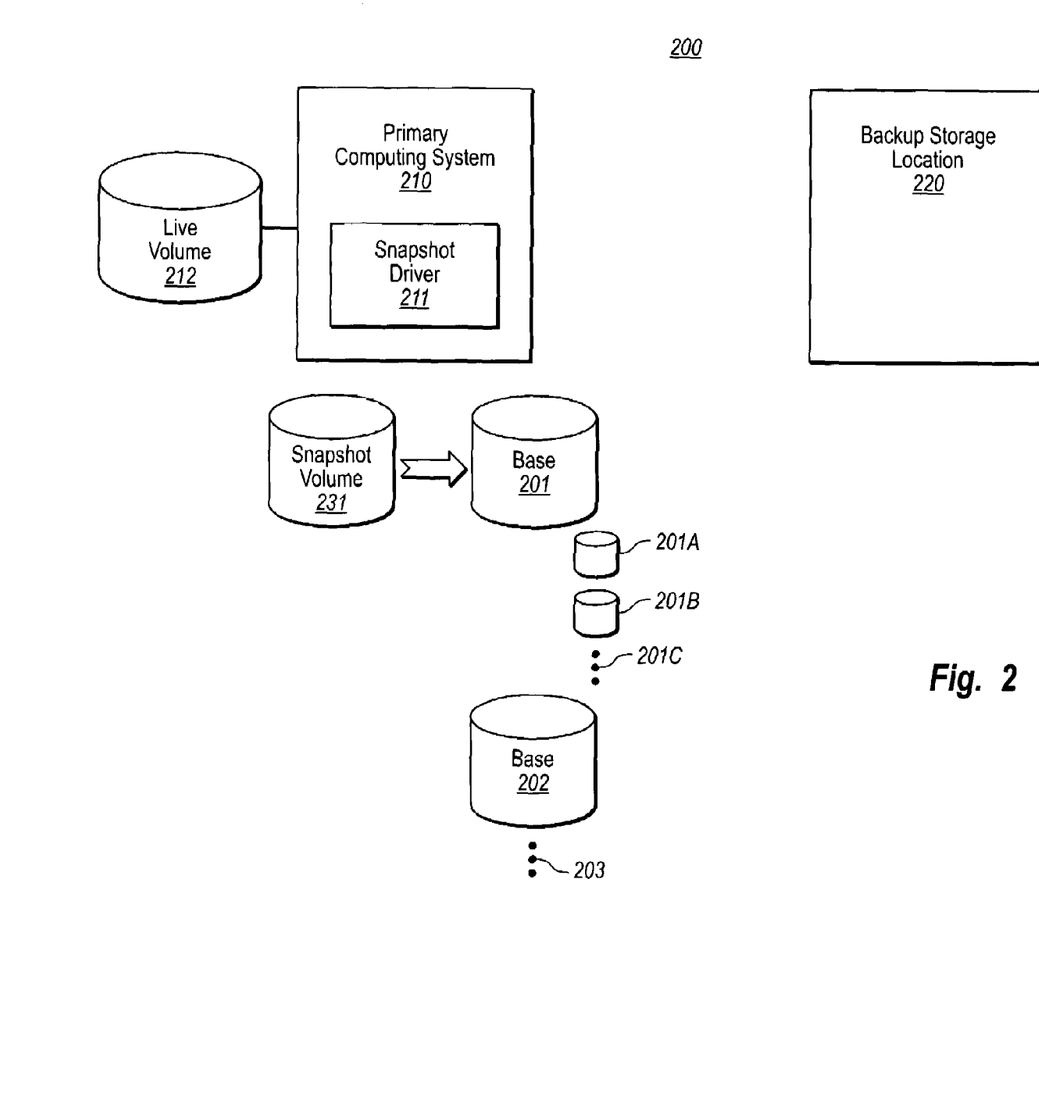
FIG. 2 illustrates a general environment in which the principles of the present invention may be employed including a primary computing system having a snapshot driver configured to dispatch base and incremental images of a volume to a backup storage location.

FIG. 2 illustrates an environment 200 that includes a primary computing system 210 that is configured to take base images and incremental images, and send those images for backup purposes to a backup storage location 220. The primary computing system 210 may, but need not, be structured as described above for the computing system 100 of FIG. 1. The backup storage location 220 may be located over a network, or may be directly connected to the primary computing system 210. The backup storage location 220 may, but need not, be associated with a backup computing system.

The primary computing system 210 operates a snapshot driver 211, which is a component or collection of components that operates to periodically take a snapshot volume of the live volume 212. A snapshot volume is identical to the live volume as the live volume existed at the time that the snapshot was taken. For example, the snapshot driver 211 generates snapshot volume 231. A corresponding backup image may then be generated based on the snapshot volume. The snapshot driver 211 then causes the backup image to be dispatched. The snapshot volume may be used to generate base images (e.g., base images 201, 202 amongst potentially many more as represented by the vertical ellipses 203), or incremental images between base images (e.g., incremental images 201A, 201B, amongst potentially more 201C between base image 201 and base image 202). The base images represent backup data for all sectors to be protected by backup. The incremental images represent only changed sectors on the live volume since the time of the last backup, whether that prior backup was a base image, or also an incremental image.

Figure 3:
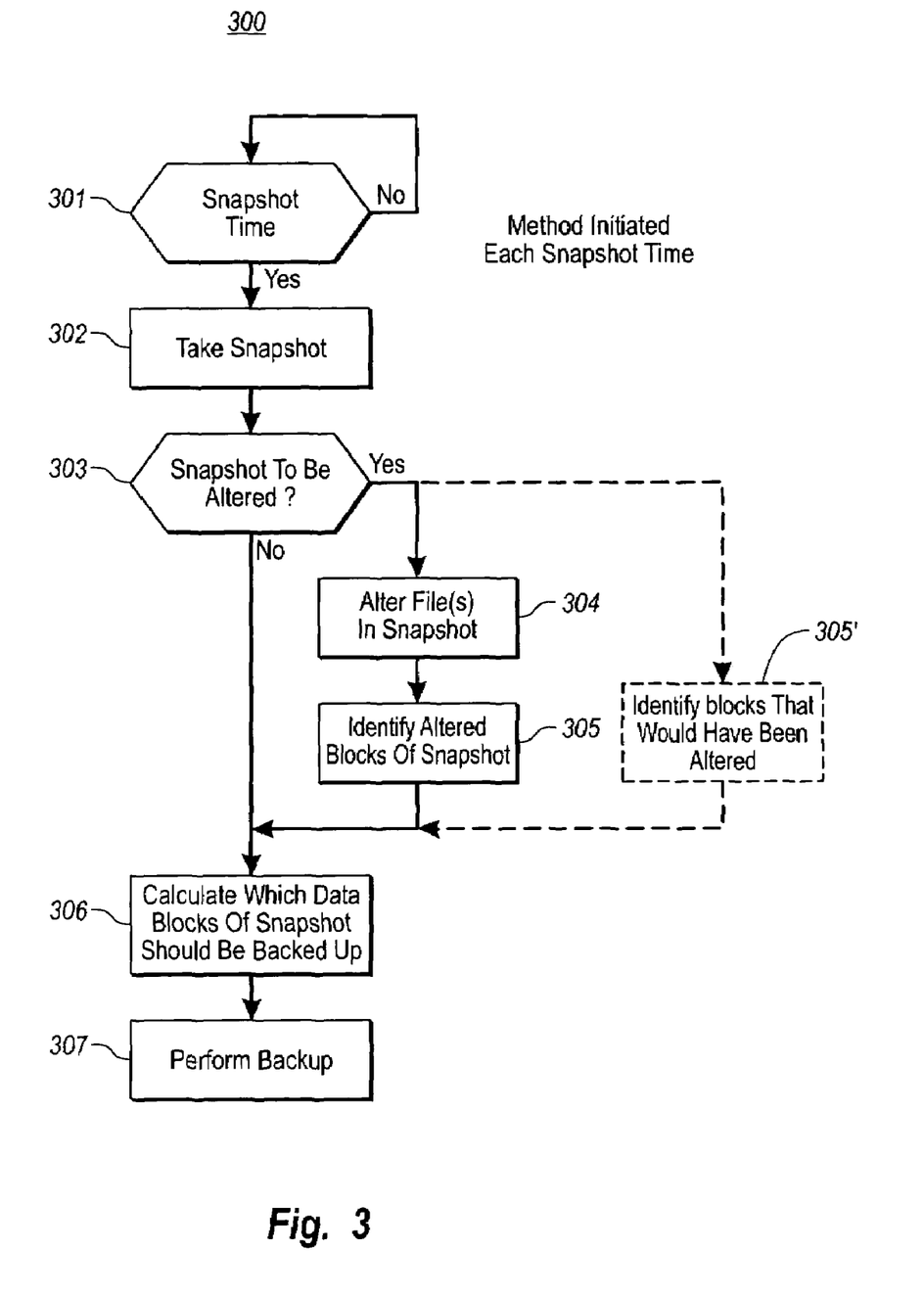
FIG. 3 illustrates a flowchart of a method for performing incremental backup of a set of data blocks in accordance with the principles of the present invention.
Figure 4:
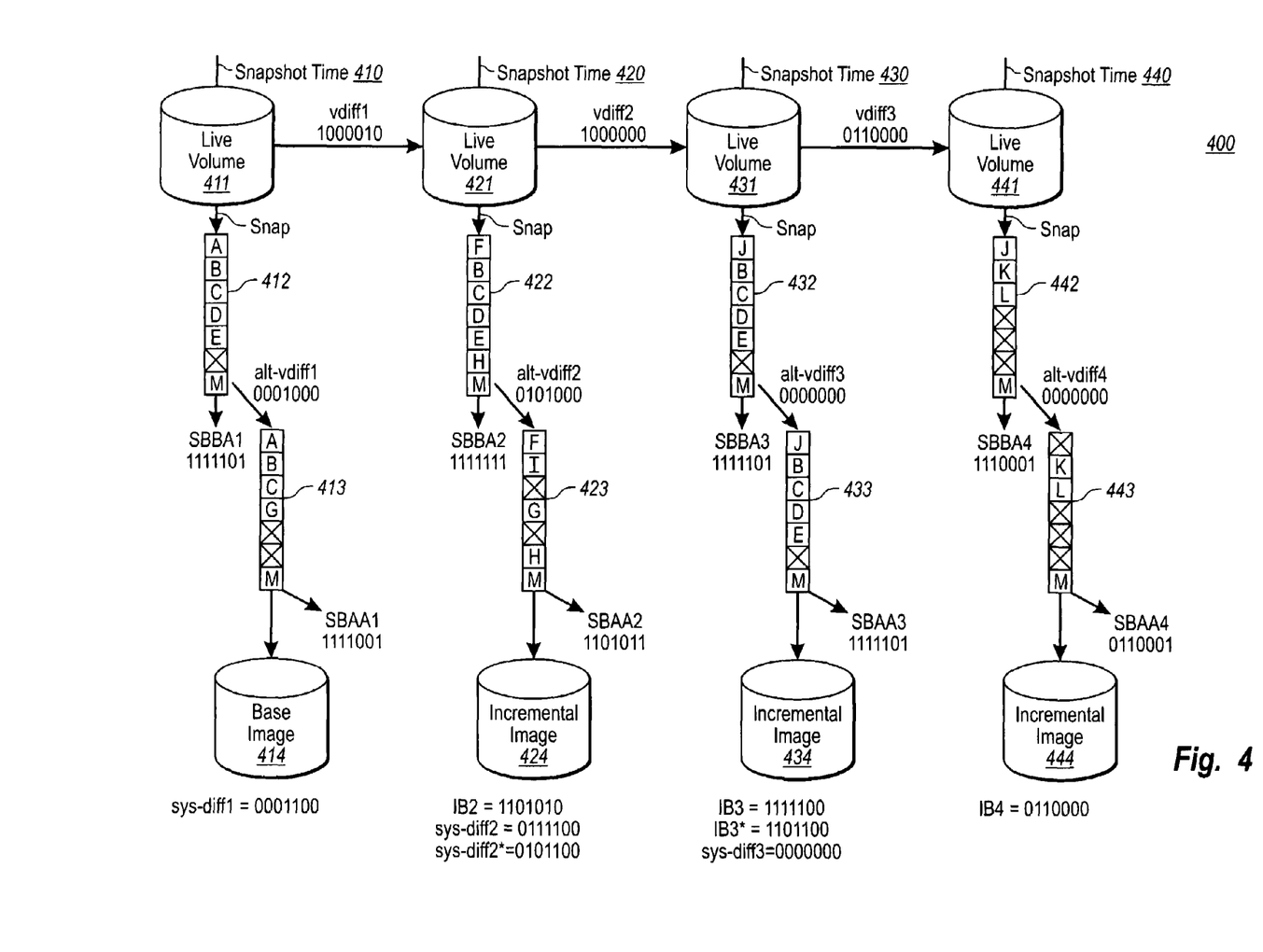
FIG. 4 illustrates an example data flow and associated data structures for the generation of a base image, and subsequent incremental images in accordance with the principles of the present invention.

FIG. 3 illustrates a flowchart of a method 300 for generating an incremental backup of a set of data blocks in accordance with the principles of the present invention. FIG. 4 shows a specific example of data structures 400 associated with the generation of a base image and three subsequent incremental images. As the specific example of FIG. 4 is useful for understanding the method 300 of FIG. 3, the method 300 of FIG. 3 will be described with frequent reference to FIG. 4.

The method 300 may be initiated each time a snapshot of the live volume is to be taken ("Yes" in decision block 301). Referring to FIG. 4, for example, time moves from left to right in the Figure. Accordingly, the first illustrated snapshot time is snapshot time 410 at which time the live volume has state 411. Although the determination mechanism for identifying a snapshot time is not important for the principles of the present invention, the snapshot times may be periodic, event or request driven, or the result of some other snapshot time determination algorithm.

Referring back to FIG. 3, the snapshot driver takes a snapshot at the snapshot time (act 302). The principles of the present invention are not restricted to any particular mechanism for capturing the state of a volume. One mechanism for capturing the state of a volume having a number of data blocks is to track writes to data blocks in the volume. Whenever there is a write to the actual location of a data block, the data block to be written over is instead preserved to alternative preservation location (either physically or virtually) if that write was the first write to the data block since the time of the snapshot. The write is then permitted to the actual location of the data block after the prior state of the data block has been preserved in the alternative preservation location. A bitmap or other tracking mechanism may be used to indicate on a block-by-block basis whether the block has or has not been written to since the time of the snapshot. The snapshot may be reconstructed by accessing the appropriate data block from the alternate or actual location, as appropriate, given whether the block has or has not been written to since the time of the snapshot. Multiple snapshots may be maintained simultaneously for multiple different snapshot times.

For instance, referring to FIG. 4, snapped volume 412 includes 7 data blocks. The content of the first five data blocks are each symbolized by a capital letter (e.g., capital letters "A" through "E" for snapped volume 412). The content of the seventh data block is also symbolized by a capital letter (e.g., "M"). The capital letters symbolically represent content of the data block. Where two data blocks have different associated capital letters, this means that the content of the data blocks is different. An "X" in a data block (as in the sixth data block of snapshot volume 412), indicates that the sixth data block is not used (e.g., is not currently allocated by the file system). In the description of FIG. 4, the use of the terms "first", "second", "third", and so forth when used to modify the term "data blocks" refers to the vertical position of the data block in the snapshot, where "first" is the top data block, and "seventh" is the bottom data block.

For purposes that will become clear further below, a data structure called System Bitmap Before Alteration (also referred to as "SBBA") represents a bitmap of those data blocks that are in use in the snapshot before the snapshot is altered. For instance, in FIG. 4, since the first through fifth and seventh data blocks of the snapshot 412 are in use, and the sixth data block of the snapshot 412 is not, the SBBA for the snapshot 412 (hereinafter "SBBA1") is 1111101. In this description and in the claims, the use of the terms "first", "second" and so forth, unless otherwise stated, does not imply any sort of absolute or relative positional or chronological relationship, but may be used merely to distinguish one item from another.

The volume may be a disk drive, in which the data blocks may be a sector, a cluster, or any other segment of the disk drive. However, volumes are not limited to disk drives, but may be any other form of non-volatile or volatile memory, or perhaps even just a portion of a volume (e.g., one or more directories or portions thereof). The size and characteristics of the data blocks may differ depending on the nature of the volume.

Returning to method 300, once the snapshot is taken (act 302), different process flows may be executed depending on whether or not the snapshot is to be altered (decision block 303). If the snapshot is not to be altered (No in decision block 303), the procedure may forego acts 304 and 305 described in further detail hereinafter, and proceed instead directly to act 306 also described in further detail hereinafter. Nevertheless, the principles of the present invention are advantageously applied when the snapshot is altered (Yes in decision block 303), to thereby reduce the size of the backup, and thus most snapshots in the example 400 of FIG. 4 undergo some alteration.

In particular, if the snapshot is to be altered (YES in decision block 303), one or more files included in the snapshot may then be altered (act 304). In this description and in the claims, "altered" when applied to a file or data block means that the file or data block is either added, modified, or deleted. In the case of a data block, adding or deleting a data block is often accomplished by allocating and de-allocating, respectively, the data block. Such files may be any files that are not to be backed up. Such files may include less desirable or less critical files such as, for example, temporary Internet files, or files relegated to the electronic recycle bin. The alteration of the files in the snapshot does not mean that the associated real live volume copy of the file is altered. For instance, temporary Internet files may all be deleted in the snapshot while keeping all of the Internet files in the live volume. The identity of such files may be set by one or more users, a network administrator, and/or may be predetermined by one or more default settings. In one embodiment, a separate drive may be created for access to the snapshot volume. Then regular file system requests may be issued to alter the appropriate files in the snapshot volume.

The primary computing system may then identify which data blocks in the snapshot volume have been altered as a result of the file alteration (act 305). This may be done by monitoring data block write, allocation, a de-allocation requests as the file alterations are being made. For instance, referring to FIG. 4, in the process of making file alterations, snapshot 412 changes to altered snapshot 413. Specifically, in this example, the first through third data blocks are not altered and remain at "A", "B", and "C", respectively, the fourth data block is modified (e.g., from "D" to "G"), the fifth data block is de-allocated, the sixth data block remains de-allocated, and the seventh data block is not altered and remains at "M". For example, suppose a temporary Internet file is deleted. Deletion of a file is often accomplished by the file system by modifying a pointer in a directory entry, whereas the actual data for the file is not deleted, but the blocks that contain the data are de-allocated. Accordingly, the fourth data block may be the directory entry for the file, whereas the fifth data block may contain the data for the deleted file. Note that the seventh data block in this example (having state "M") is the only data block that is not altered from snapshot time 410 to snapshot time 440. However, in many systems, the majority of data blocks of the volume are rarely altered. Nevertheless, to demonstrate how the incremental backup is performed, most of the data blocks in this example are altered.

In one embodiment of the invention, instead of actually altering the file (act 304) and determining what data blocks have been altered (act 305), the process may be performed virtually. For instance, the data blocks that would be altered (had the file alterations been made) are identified without actually making the file alterations (act 305') illustrated in dashed form to represent that this is an alternative embodiment. While this alternative act 305' may be performed at any point replacing acts 304 and 305, the described example will concentrate on acts 304 and 305 being performed in which the files are actually altered.

For purposes that will become clear further below, a data structure called System Bitmap After Alteration (also referred to as "SBAA") represents a bitmap of those data blocks that are in use in the snapshot after the snapshot is altered. For instance, in FIG. 4, since the first through fourth and seventh data blocks of the altered snapshot 413 are in use, and the fifth and sixth data blocks of the altered snapshot 413 are not, the SBAA for the altered snapshot 413 (hereinafter "SBAA1") is 1111001. In addition, the system maintains a bitmap (called hereinafter "alt-vdiff") for those data blocks that were modified. For instance, the alt-vdiff bitmap for the snapshot 412 is called alt-vdiff1, and is 0001000 indicating that only the fourth data block was modified (e.g., from "D" to "G"). In this specific example, de-allocations and allocations of memory are not counted as modifications.

Referring back to FIG. 3, the primary computing system then calculates which of the set of data blocks in the snapshot should be backed up (act 306). This is performed regardless of whether or not the snapshot has been altered (decision block 303). If the snapshot is altered, however, the backup is based on the SBAA bitmap. In the example of FIG. 4, where a full or base backup is being taken, a set bit in the SBBA bitmap means that the corresponding data block should be included in the backup. Thus, the base image 414 is constructed to include the first through fourth and seventh data blocks of the altered snapshot 413. The primary computing system then performs the backup using at least a portion of the first snapshot (act 307).

For purposes that will be described hereinafter, the primary computing system also calculates a sys-diff bitmap for each backup. For the base image 414 of FIG. 4, the sys-diff bitmap is referred to as "sys-diff1" and may be defined by the following bit-wise Equation (1):

$$\text{sys-diff1} = (\text{SBBA1 XOR SBAA1}) \text{ OR alt-vdiff1} \qquad (1)$$

Thus, in this example, sys-diff1 is 0001100. Sys-diff1 represents data blocks that were altered (e.g., modified, allocated, or de-allocated) as a result of the file alterations. That completes processing for the base image in this example.

However, the live volume is still being altered. Since the next backup is to be an incremental backup, the primary computing system monitors alterations to the data blocks in the live volume that are to be subjected to the snapshot. In the example of FIG. 4, this is done using a vdiff bitmap. In particular, the vdiff1 bitmap is used to monitor changes made between snapshot time 410 and snapshot time 420, in which the live volume had state 421. In the example of FIG. 4, the first data block has been modified (from "A" to "F"), and the sixth data block has been modified (from being de-allocated to being allocated with state "H"). Accordingly, the vdiff1 bitmap is 1000010.

At the snapshot time 420 (Yes in decision block 301), the snapshot 422 is taken (act 302) reflecting these incremental changes to the live volume. The SBBA for the second snapshot (illustrated as "SBBA2") is 1111111 since all data blocks in the snapshot 422 are used. The appropriate files of the snapshot are then altered (act 304) resulting in several alterations to the data blocks of the snapshot (act 305) resulting in altered snapshot 423. The file alterations caused the third and fifth data blocks to be de-allocated resulting in an SBAA for the altered snapshot 423 (referred to herein as "SBAA2") of 1101011. Furthermore, the second data block has been modified (from "B" to "I"), and the fourth data block has been modified (from "D" to "G"), resulting in an alt-vdiff bitmap for the altered snapshot 423 (illustrated as "alt-vdiff2") of 0101000.

The alterations to the fourth and fifth data blocks from snapshot 422 to altered snapshot 423 are the same as they were to the fourth and fifth data blocks from snapshot 412 to altered snapshot 413. Additionally, however, suppose that a file has been moved to the recycle bin and thus is not to be backed up. Suppose further that the data for the recycled file is in the third data block, and the directory entry for the recycled file is in the second data block. That would explain the modification of the second data block and the de-allocation of the third data block in the altered snapshot 423.

The data blocks that are to be included in the incremental image 424 are then calculated (act 306). For the incremental image, this calculation is a function of the identity of which data blocks in the prior snapshot have been altered (if any) (or would have been altered in the case of act 305') (in the example, represented by sys-diff1), the identity of which data blocks in the current snapshot have been altered (if any) (or would have been altered in the case of act 305') (in the example, represented by alt-vdiff2), and/or the identity of which data blocks have changed between the times of the prior and current snapshots (in the example, represented by vdiff1). For instance, a bitmap (illustrated in IB2) representing the identity of which data blocks should be backed up in the incremental backup may be calculated as follows in Equation (2):

$$\text{IB2} = (\text{sys-diff1 OR vdiff1 OR alt-vdiff2}) \text{ AND SBAA2} \qquad (2)$$

In the illustrated case, the IB2 bitmap is 1101010. Thus, the incremental image is then constructed by including the data blocks specified by IB2 (act 307). Specifically, the first, second, fourth, and sixth data blocks are included in the bitmap. As previously mentioned, the seventh data block is the only data block in the example that remains static from snapshot time 410 to snapshot time 440. Since the seventh data block has not changed from snapshot time 410 to snapshot time 420, that data block is not included in the incremental image 424. In a typical system, most of the data blocks in the volume may remain unchanged. In such systems, the incremental images calculated using this method may include only a small number of the total number of data blocks.

For the next incremental image, the sys-diff bitmap for the incremental image 424 may then calculated using the following equation (3A):

$$\text{sys-diff2} = (\text{SBBA2 XOR SBAA2}) \text{ OR alt-vdiff2} \tag{3A}$$

In the illustrated case, sys-diff2 is 0111100. Equation (3A) may be improved upon since there are cases where the incremental image contains blocks that are unchanged and captured in previous images (either the base or an earlier incremental). One way this might happen is if a file is captured in a base image. Later this file is deleted by the user, but WINDOWS only moves it to the recycle bin. In most cases, this only results in the meta-data related to the file being relocated from its directory entry to the recycle bin. The actual file data remains unchanged in its same location. If an incremental image is taken and the recycle bin is emptied in the snapped volume, then the file's data blocks are present in SBBA but not present in SBAA, so these blocks will be set in the sys-diff. For instance, the user moved a file to the recycle bin resulting in the modification of the second block and the de-allocation of the third block in the altered snapshot 423. Accordingly, the third bit in SBBA2 is one, whereas the third bit in SBAA2 is zero.

Suppose before the next incremental, the user restores the file from the recycle bin (as will be the case described hereinafter when the user restores the file having the second data block describing its directory entry, and the third data block describing the content of the file). When the subsequent incremental is taken, the file's data blocks will be set in the sys-diff bitmap and SBAA bitmap, so they will be re-captured in the incremental image, even though they do not need to be, since the data might just as easily be acquired from the base image. Other common cases where this might happen include when the set of files deleted changes, or if a file is moved or renamed such that it is no longer deleted in the snapped volume. Not recapturing these blocks a second time makes taking the incremental faster and makes the resulting incremental image smaller.

This case can never happen for a base image, or for the first incremental. It can happen for the second or subsequent incremental images. These extraneous blocks may avoid being unnecessarily re-captured by modifying how the sys-diff bitmap is computed. For instance, the alternate sys-diff bitmap (called herein sys-diff2*) for the incremental image 424 may be calculated as follows in Equation (3B):

$$\text{sys-diff2*} = [(\text{vdiff1 OR sys-diff1}) \text{ AND (SBBA2 XOR SBAA2})] \text{ OR alt-vdiff2} \tag{3B}$$

In the illustrated case, sys-diff2* is 0101100. Note that rather than keeping sys-diff2 around until it is needed to compute incremental bitmap IB3 (described hereinafter), the snapshot driver could OR it with the current vdiff and then discard it. The current vdiff bitmap will be vdiff2 when the next snapshot is taken. Also, if the primary computing system loses track of the vdiff bitmap, perhaps because of a blue screen or improper shutdown, and a reconcile is performed, the vdiff computed by the reconcile will be the same as what the vdiff should have been, ORed with the sys-diff, then ANDed with SBBA.

Continuing with the second incremental image 434 in FIG. 4, the primary computing system monitors alterations to the data blocks in the live volume between the snapshot times 420 and 430 using the vdiff2 bitmap. Here, once again, the first data block has been modified (from "F" to "J"). Accordingly, the vdiff2 bitmap is 1000000. Note that the de-allocation of the sixth block did not result in a write to the sixth block, and thus the de-allocation is not captured in the vdiff2 bitmap.

At the snapshot time 430 (Yes in decision block 301), the snapshot 432 is taken (act 302) reflecting these incremental changes to the live volume causing state 431. The SBBA for the third snapshot (illustrated as "SBBA3") is 1111101 since all data blocks in the snapshot 432 (except the sixth data block) are used. In this case, however, the snapshot is not altered (No in decision block 303). Accordingly, the corresponding SBAA (illustrated as "SBAA3") is the same 1111101. Furthermore, no data blocks have been modified. Accordingly, the corresponding alt-vdiff bitmap (illustrated as "alt-vdiff3") is 0000000.

The lack of any change to the second and third data blocks could be explained by a restoration of the file previously moved to the recycle bin. The lack of any change to the fourth and fifth data blocks could be explained by the user electing to backup temporary Internet files.

The data blocks that are to be included in the incremental image 434 are then calculated (act 306). Once again, the calculation is a function of the identify of which data blocks in the prior snapshot have been (or would have been in the case of act 305') altered (if any) (in the example, represented by sys-diff2 or sys-diff2*), the identify of which data blocks in the current snapshot have been (or would have been in the case of act 305') altered (if any) (in the example, represented by alt-diff3), and/or the identify of which data blocks have changed between the times of the prior and current snapshots (in the example, represented by vdiff2). For instance, a bitmap (illustrated as IB3) representing the identify of which data blocks should be backed up in the incremental backup may be calculated as follows in Equation (4):

$$\text{IB3} = (\text{sys-diff2 OR vdiff2 OR alt-vdiff3}) \text{ and SBAA3} \tag{4}$$

In the illustrated case, the IB3 bitmap is 1111100 if calculated using the sys-diff2 calculated in Equation (3A). Alternatively, the IB3 bitmap (in this case, illustrated as "IB3*") is calculated using the sys-diff2* bitmap calculated in Equation (3B) resulting in IB3* bitmap 1101100. Thus, the incremental image is then constructed by including the data blocks specified by the IB3 or IB3* bitmaps (act 307).

For the next incremental image, the sys-diff bitmap for the incremental image 434 may then calculated using the following equations (5A) and (5B):

$$\text{sys-diff3} = (\text{SBBA3 XOR SBAA3}) \text{ OR alt-vdiff3} \tag{5A}$$

$$\text{sys-diff3*} = [(\text{vdiff2 OR sys-diff2}) \text{ AND (SBBA3 XOR SBAA3})] \text{ OR alt-vdiff3} \tag{5B}$$

In the illustrated case, sys-diff3 is 0000000, regardless of whether Equation (5A) or (5B) is being used, and regardless of whether sys-diff2 or sys-diff2* is used for Equation (5B).

Continuing with the last illustrated incremental image 444 in FIG. 4, the primary computing system monitors alterations to the data blocks in the live volume between the snapshot times 430 and 440 using the vdiff3 bitmap. Here, the second data block has been modified (from "B" to "K"), and the third data block has been modified (from "C" to "L"). Accordingly, the vdiff3 bitmap is 0110000. Again note that de-allocation does not require a write to the de-allocated block, so the de-allocation of the third through sixth data blocks is not captured in vdiff3.

At the snapshot time 440 (Yes in decision block 301), the snapshot 442 is taken (act 302) reflecting these incremental changes to the live volume causing state 441. The SBBA for the fourth snapshot (illustrated as "SBBA4") is 1110001 since only the first three and seventh data blocks in the snapshot 442 are used. The appropriate files of the snapshot are then altered (act 304) resulting in one alteration to the data blocks of the snapshot (act 305), and resulting in altered snapshot 443. The file alterations caused the first data block to additionally be de-allocated, and so the corresponding SBAA (illustrated as "SBAA4") is 0110001. Furthermore, no data blocks have been modified. Accordingly, the corresponding alt-vdiff bitmap (illustrated as "alt-vdiff4") is 0000000.

The data blocks that are to be included in the incremental image 444 are then calculated (act 306). Once again, the calculation is a function of the identify of which data blocks in the prior snapshot have been (or would have been in the case of act 305') altered (if any) (in the example, represented by sys-diff3 or sys-diff3*), the identify of which data blocks in the current snapshot have been (or would have been in the case of act 305') altered (if any) (in the example, represented by alt-diff4), and/or the identify of which data blocks have changed between the times of the prior and current snapshots (in the example, represented by vdiff3). For instance, a bitmap (illustrated as IB4) representing the identify of which data blocks should be backed up in the incremental backup may be calculated as follows in Equation (6):

IB4=(sys-diff3 OR vdiff3 OR alt-vdiff4) AND SBAA4

In the illustrated case, the IB4 bitmap is 0110000. The incremental image 444 may then be constructed based on the IB4 bitmap.

This process could be completed for subsequent incremental images for this base image, and for additional base images with corresponding incremental images.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for generating an incremental backup of a set of data blocks, the method comprising:

taking a first snapshot of the set of data blocks;

altering the first snapshot by deleting one or more files stored in a temporary storage location from the first snapshot, wherein the deleted files are associated with data blocks included in the first snapshot, and wherein the temporary storage location comprises a volume on a hard disk drive;

wherein deleting one or more files associated with a first data block comprises:

modifying a pointer in a second data block configured to point to the one or more files associated with the first data block, wherein the modified pointer is configured to not point to the one or more files associated with the first data block; and deallocating memory associated with the first data block;

identifying which data blocks in the first snapshot have been altered as a result of deleting the one or more files from the first snapshot;

performing a first backup of the set of data blocks using at least a portion of the first snapshot;

taking a second snapshot of the set of data blocks subsequent to taking a first snapshot of the set of data blocks;

identifying which data blocks of the set of data blocks have changed between the first and second snapshots; and calculating which of the set of data blocks in the second snapshot to back up in a second backup of the set of data blocks, wherein the second backup is an incremental backup and wherein the calculation is a function of at least the identity of which data blocks in the first snapshot have been altered during the deleting of the one or more files from the first snapshot, and wherein calculating which of the set of data blocks in the second snapshot to back up in the second backup is also a function of at least the identity of which data blocks of the set of data blocks have changed between the first and second snapshots.

2. The method in accordance with claim 1, wherein the first backup is a base backup.

3. The method in accordance with claim 1, wherein the first backup is an incremental backup.

4. The method in accordance with claim 1, further comprising:

altering one or more files having associated data blocks included in the second snapshot; and identifying which data blocks in the second snapshot have been altered as a result of the altering the one or more files having associated data blocks included in the second snapshot, wherein calculating which of the set of data blocks in the second snapshot to back up in the second backup is also a function of at least the identity of which data blocks in the second snapshot have been altered during the altering one or more files having associated data blocks included in the second snapshot.

5. The method in accordance with claim 4, further comprising:

identifying which data blocks of the set of data blocks have changed between the first and second snapshots, wherein calculating which of the set of data blocks in the second snapshot to back up in the second backup is also a function of at least the identity of which data blocks of the set of data blocks have changed between the first and second snapshots.

6. The method in accordance with claim 4, further comprising:

taking a third snapshot of the set of data blocks subsequent to taking a second snapshot of the set of data blocks; and calculating which of the set of data blocks in the third snapshot to back up in a third backup of the set of data blocks, wherein the third backup is an incremental backup and wherein the calculation is a function of at least the identity of which data blocks in the second snapshot have been altered during the altering one or more files having associated data blocks included in the second snapshot.

7. The method in accordance with claim 6, further comprising:

altering one or more files having associated data blocks included in the third snapshot; and identifying which data blocks in the third snapshot have been altered as a result of altering the one or more files having associated data blocks included in the third snapshot, wherein calculating which of the set of data blocks in the third snapshot to back up in the third backup is also a function of at least the identity of which data blocks in the third snapshot have been altered during the altering of one or more files having associated data blocks included in the third snapshot.

8. The method in accordance with claim 7, further comprising:

identifying which data blocks of the set of data blocks have changed between the second and third snapshots, wherein calculating which of the set of data blocks in the third snapshot to back up in the third backup is also a function of at least the identity of which data blocks of the set of data blocks have changed between the second and third snapshots.

9. The method in accordance with claim 4, further comprising:

taking a third snapshot of the set of data blocks subsequent to taking a second snapshot of the set of data blocks; and identifying which data blocks of the set of data blocks have changed between the second and third snapshots, wherein calculating which of the set of data blocks in the third snapshot to back up in the third backup is also a function of at least the identity of which data blocks of the set of data blocks have changed between the second and third snapshots.

10. A computer-readable storage medium having computer-readable instructions, the computer-readable instructions being executable by a computer processor to:

take a first snapshot of a set of data blocks;

alter the first snapshot by deleting one or more files stored in a temporary storage location from the first snapshot, wherein the deleted files are associated with data blocks included in the first snapshot, and wherein the temporary storage location comprises a volume on a hard disk drive;

wherein the computer-readable instructions to alter the first snapshot by deleting one or more files associated with a first data block are executable by a computer processor to:

modify a pointer in a second data block configured to point to the one or more files associated with the first data block, wherein the modified pointer is configured to not point to the one or more files associated with the first data block; and deallocate memory associated with the first data block;

identify which data blocks in the first snapshot have been altered as a result of the deletion of the one or more files from the first snapshot;

perform a first backup of the set of data blocks using at least a portion of the first snapshot;

take a second snapshot of the set of data blocks subsequent to the first snapshot of the set of data blocks;

identify which data blocks of the set of data blocks have changed between the first and second snapshots; and calculate which of the set of data blocks in the second snapshot to back up in a second backup of the set of data blocks, wherein the second backup is an incremental backup and wherein the calculation is a function of at least the identity of which data blocks in the first snapshot have been altered during the deletion of the one or more files from the first snapshot, and wherein the calculation of which of the set of data blocks in the second snapshot to back up in the second backup is also a function of at least the identity of which data blocks of the set of data blocks have changed between the first and second snapshots.

11. A method for generating an incremental backup of a set of data blocks, the method comprising:

taking a current snapshot of the set of data blocks;

altering the current snapshot by deleting one or more files stored in a temporary storage location from the current snapshot, wherein the deleted files are associated with data blocks included in the current snapshot, and wherein the temporary storage location comprises a volume on a hard disk drive;

wherein deleting one or more files associated with a first data block comprises:

modifying a pointer in a second data block configured to point to the one or more files associated with the first data block, wherein the modified pointer is configured to not point to the one or more files associated with the first data block; and deallocating memory associated with the first data block;

identifying which data blocks in the current snapshot have been altered as a result of deleting the one or more files from the current snapshot;

identifying which data blocks of the set of data blocks have changed between the current snapshot and a prior snapshot; and calculating which of the set of data blocks in the current snapshot of the set of data blocks to incrementally back up in a current backup as a function of at least the identity of which data blocks in the current snapshot have been altered during the deleting of one or more files from the current snapshot, and wherein calculating which of the set of data blocks in the current snapshot to incrementally back up is also a function of at least the identity of which data blocks of the set of data blocks have changed between the prior and current snapshots.

12. The method in accordance with claim 11, wherein the prior backup is a base backup.

13. The method in accordance with claim 11, wherein the prior backup is an incremental backup.

14. The method in accordance with claim 11, further comprising:

taking a third snapshot of the set of data blocks subsequent to taking the current snapshot of the set of data blocks; and calculating which of the set of data blocks in the third snapshot to back up in a third backup of the set of data blocks, wherein the third backup is an incremental backup and wherein the calculation is a function of at least the identity of which data blocks in the current snapshot have been altered during the altering of one or more files having associated data blocks included in the current snapshot.

15. The method in accordance with claim 14, further comprising:

altering one or more files having associated data blocks included in the third snapshot; and identifying which data blocks in the third snapshot have been altered as a result of the altering of the one or more files having associated data blocks included in the third snapshot, wherein calculating which of the set of data blocks in the third snapshot to back up in the third backup is also a function of at least the identity of which data blocks in the third snapshot have been altered during the altering of one or more files having associated data blocks included in the third snapshot.

16. The method in accordance with claim 15, further comprising:
identifying which data blocks of the set of data blocks have changed between the current and third snapshots,
wherein calculating which of the set of data blocks in the third snapshot to back up in the third backup is also a function of at least the identity of which data blocks of the set of data blocks have changed between the current and third snapshots.

17. The method in accordance with claim 14, further comprising:
identifying which data blocks of the set of data blocks have changed between the current and third snapshots,
wherein calculating which of the set of data blocks in the third snapshot to back up in the third backup is also a function of at least the identity of which data blocks of the set of data blocks have changed between the current and third snapshots.

18. A computer-readable storage medium having computer-readable instructions, the computer-readable instructions being executable by a computer processor to:
take a first snapshot of a set of data blocks;
alter the first snapshot by deleting one or more files stored in a temporary storage location from the first snapshot, wherein the deleted files are associated with data blocks included in the first snapshot, and wherein the temporary storage location comprises a volume on a hard disk drive;
wherein the computer-readable instructions to alter the first snapshot by deleting one or more files associated with a first data block are executable by a computer processor to:
modify a pointer in a second data block configured to point to the one or more files associated with the first data block, wherein the modified pointer is configured to not point to the one or more files associated with the first data block; and
deallocate memory associated with the first data block;
identify which data blocks in the first snapshot have been altered as a result of deleting the one or more files from the first snapshot;
perform a first backup of the set of data blocks using at least a portion of the first snapshot;
take a second snapshot of the set of data blocks subsequent to the first snapshot of the set of data blocks;
identify which data blocks of the set of data blocks have changed between the first and second snapshots; and
calculate which of the set of data blocks in the second snapshot to back up in a second backup of the set of data blocks, wherein the second backup is an incremental backup and wherein the calculation is a function of at least the identity of which data blocks in the first snapshot have been altered during the deletion of the one or more files from the first snapshot, and wherein the calculation of which of the set of data blocks in the second snapshot to back up in the second backup is also a function of at least the identity of which data blocks of the set of data blocks have changed between the first and second snapshots.

19. A method for generating an incremental backup of a set of data blocks, the method comprising:
taking a first snapshot of the set of data blocks;
estimating at least what one or more files stored in a temporary storage location, and associated with data blocks included in the first snapshot, should be deleted from the first snapshot in order for backup to include the appropriate files, wherein the temporary storage location comprises a volume on a hard disk drive;
wherein deleting one or more files associated with a first data block comprises:
modifying pointer in a second data block configured to point to the one or more files associated with the first data block, wherein the modified pointer is configured to not point to the one or more files associated with the first data block; and
deallocating memory associated with the first data block;
identifying which data blocks in the first snapshot would have been altered if the one or more files had been deleted from the first snapshot;
performing a first backup of the set of data blocks using at least a portion of the first snapshot;
taking a second snapshot of the set of data blocks subsequent to taking a first snapshot of the set of data blocks;
identifying which data blocks of the set of data blocks have changed between the first and second snapshots; and
calculating which of the set of data blocks in the second snapshot to back up in a second backup of the set of data blocks, wherein the second backup is an incremental backup and wherein the calculation is a function of at least the identity of which data blocks in the first snapshot should have been deleted from the first snapshot, and wherein the calculation of which of the set of data blocks in the second snapshot to back up in the second backup is also a function of at least the identity of which data blocks of the set of data blocks have changed between the first and second snapshots.

20. A computer-readable storage medium having computer-readable instructions, the computer-readable instructions being executable by a computer processor to:
take a current snapshot of a set of data blocks;
alter the current snapshot by deleting one or more files stored in a temporary storage location from the current snapshot, the deleted files are associated with data blocks included in the current snapshot, wherein the temporary storage location comprises a volume on a hard disk drive;
wherein the computer-readable instructions to alter the current snapshot by deleting one or more files associated with a first data block are executable by a computer processor to:
modify a pointer in a second data block configured to point to the one or more files associated with the first data block, wherein the modified pointer is configured to not point to the one or more files associated with the first data block; and
deallocate memory associated with the first data block;
identify which data blocks in the current snapshot have been altered as a result of the deletion of the one or more files from the first snapshot;
identify which data blocks of the set of data blocks have changed between the current snapshot and a prior snapshot; and
calculate which of the set of data blocks in the current snapshot of the set of data blocks to incrementally back up in a current backup as a function of at least the identity of which data blocks in the current snapshot have been altered during the deletion of the one or more files from the first snapshot, and wherein the calculation of which of the set of data blocks in the current snapshot to incrementally back up is also a function of at least the identity of which data blocks of the set of data blocks have changed between the prior and current snapshots.

21. The computer-readable storage medium of claim 20, wherein the instructions are further executable by a computer processor to perform a first backup of the set of data blocks using at least a portion of the current snapshot.

22. The computer-readable storage medium of claim 20, wherein the instructions are further executable by a computer processor to take a second snapshot of the set of data blocks subsequent to the current snapshot of the set of data blocks.

* * * * *